US007856762B2

(12) United States Patent
Deisenroth et al.

(10) Patent No.: US 7,856,762 B2
(45) Date of Patent: Dec. 28, 2010

(54) MODULAR SHELTER SYSTEM, PARTICULARLY FOR TRANSPORT OF PERSONS AND/OR OBJECTS

(75) Inventors: Ulf Deisenroth, Lohmar (DE); Frank-Ulrich Bombien, Siegburg (DE)

(73) Assignee: Ulf Deisenroth, Lohmar (DE)

( * ) Notice: Subject to any disclaimer, the term of this patent is extended or adjusted under 35 U.S.C. 154(b) by 688 days.

(21) Appl. No.: 10/573,537

(22) PCT Filed: Sep. 24, 2004

(86) PCT No.: PCT/DE2004/002134

§ 371 (c)(1),
(2), (4) Date: Apr. 12, 2006

(87) PCT Pub. No.: WO2005/031245

PCT Pub. Date: Apr. 7, 2005

(65) Prior Publication Data
US 2007/0094943 A1 May 3, 2007

(30) Foreign Application Priority Data
Sep. 26, 2003 (DE) .............. 203 15 057 U

(51) Int. Cl.
*E04H 9/04* (2006.01)
(52) U.S. Cl. .......................... 52/79.1; 52/143
(58) Field of Classification Search .......... 52/143, 52/79.1, 79.8, 169.6; 296/178, 24.3, 190.07, 296/64, 193.04, 35.02; 89/36.08, 36.09; 244/12.2, 23 C, 118.5, 121, 158.9, 159.1, 244/159.3; 220/88.1; 206/3
See application file for complete search history.

(56) References Cited

U.S. PATENT DOCUMENTS

| 1,281,846 | A | * | 10/1918 | Salari ..................... 244/100 R |
| 2,348,130 | A | * | 5/1944 | Hardy, Jr. ..................... 109/84 |
| 2,715,001 | A | * | 8/1955 | Provenzano ............. 244/118.5 |
| 3,034,131 | A | * | 5/1962 | Lent .............................. 2/2.14 |
| 3,049,835 | A | * | 8/1962 | Sundstrum ................. 52/169.6 |
| 3,118,636 | A | * | 1/1964 | Kantrowitz et al. ...... 244/159.1 |
| 3,138,124 | A | * | 6/1964 | Baier ......................... 109/1 S |
| 3,215,219 | A | * | 11/1965 | Forsyth et al. ............. 180/14.3 |
| 3,294,346 | A | * | 12/1966 | Summers .................... 244/121 |

(Continued)

FOREIGN PATENT DOCUMENTS

CA 2 402 753 3/2003

(Continued)

OTHER PUBLICATIONS

International Search Report.

(Continued)

*Primary Examiner*—Robert J Canfield
*Assistant Examiner*—Christine T Cajilig
(74) *Attorney, Agent, or Firm*—Collard & Roe, P.C.

(57) ABSTRACT

The invention relates to a modular shelter system, in particular for transporting persons and/or objects comprising at least one container/capsular enclosure and a reception system arranged in the case for persons and/or objects. The inventive reception system is mounted in such a way that it is isolated in the direction of the enclosure bottom and/or a receptacle is formed in such a way that it ensures a blast wave deflection.

18 Claims, 11 Drawing Sheets

U.S. PATENT DOCUMENTS

| | | | |
|---|---|---|---|
| 3,630,566 A * | 12/1971 | Barecki | 296/63 |
| 4,303,271 A * | 12/1981 | Law | 296/10 |
| 4,404,889 A * | 9/1983 | Miguel | 89/36.02 |
| 4,523,730 A * | 6/1985 | Martin | 244/122 R |
| 4,570,545 A * | 2/1986 | Sherrow | 105/354 |
| 4,593,870 A * | 6/1986 | Cronkhite et al. | 244/117 R |
| 4,739,690 A * | 4/1988 | Moskowitz | 89/36.02 |
| 5,106,668 A * | 4/1992 | Turner et al. | 428/116 |
| 5,237,784 A * | 8/1993 | Ros | 52/79.5 |
| 5,297,761 A * | 3/1994 | Kendall et al. | 244/140 |
| 5,533,781 A * | 7/1996 | Williams | 296/204 |
| 5,663,520 A * | 9/1997 | Ladika et al. | 89/36.08 |
| H1833 H * | 2/2000 | Hoppel et al. | 296/68.1 |
| 6,267,440 B1 * | 7/2001 | Hoffman | 297/216.1 |
| 6,378,939 B1 * | 4/2002 | Knoll et al. | 297/216.1 |
| 6,394,393 B1 * | 5/2002 | Mort | 244/122 R |
| 6,412,231 B1 * | 7/2002 | Palatin | 52/79.1 |
| 6,416,116 B1 * | 7/2002 | Stanton et al. | 296/178 |
| 6,568,735 B1 * | 5/2003 | Lohr et al. | 296/63 |
| 6,779,431 B2 * | 8/2004 | Honlinger | 89/36.08 |
| 6,918,501 B2 * | 7/2005 | Wang et al. | 220/1.5 |
| 7,086,553 B2 | 8/2006 | Debecker et al. | |
| 7,131,382 B2 * | 11/2006 | Gordon | 104/53 |
| 2002/0145308 A1 * | 10/2002 | Honlinger | 296/193 |
| 2004/0083671 A1 * | 5/2004 | Johnson et al. | 52/511 |
| 2004/0124037 A1 * | 7/2004 | Ruck | 187/222 |

FOREIGN PATENT DOCUMENTS

| | | |
|---|---|---|
| CH | 338 392 | 5/1959 |
| DE | 1 086 536 | 8/1960 |
| DE | 1 138 593 | 10/1962 |
| DE | 1 950 108 | 4/1971 |
| DE | 2 021 835 | 11/1971 |
| DE | 25 41 375 | 3/1977 |
| DE | 3024 437 A1 | 1/1982 |
| DE | 36 35 741 A1 | 7/1992 |
| DE | 298 09 772 U1 | 10/1998 |
| DE | 197 54 708 A1 | 6/1999 |
| DE | 694 20 544 T2 | 1/2000 |
| DE | 100 35 563 A1 | 2/2002 |
| DE | 101 17 575 A1 | 10/2002 |
| DE | 101 32 736 A1 | 1/2003 |
| EP | 0 506 502 B1 | 9/1992 |
| EP | 0 631 659 B1 | 1/1995 |
| EP | 0 828 134 A | 3/1998 |
| EP | 0 921 255 B1 | 6/1999 |
| EP | 1 293 747 A | 3/2003 |
| FR | 1 525 095 A | 5/1968 |
| GB | 1 320 382 | 6/1973 |
| JP | 06200642 A * | 7/1994 |
| WO | WO 01/57429 | 8/2001 |
| WO | WO 03/004958 A | 1/2003 |

OTHER PUBLICATIONS

Response dated Jan. 15, 2009 in European Patent Application 04 786 850 (with translation).

* cited by examiner

Figure 8A:
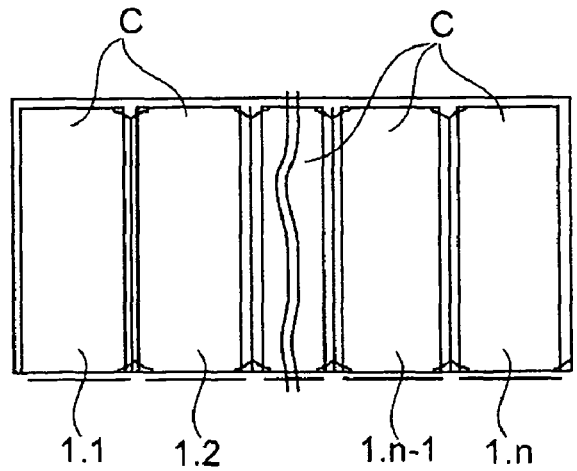
Figure 8B:
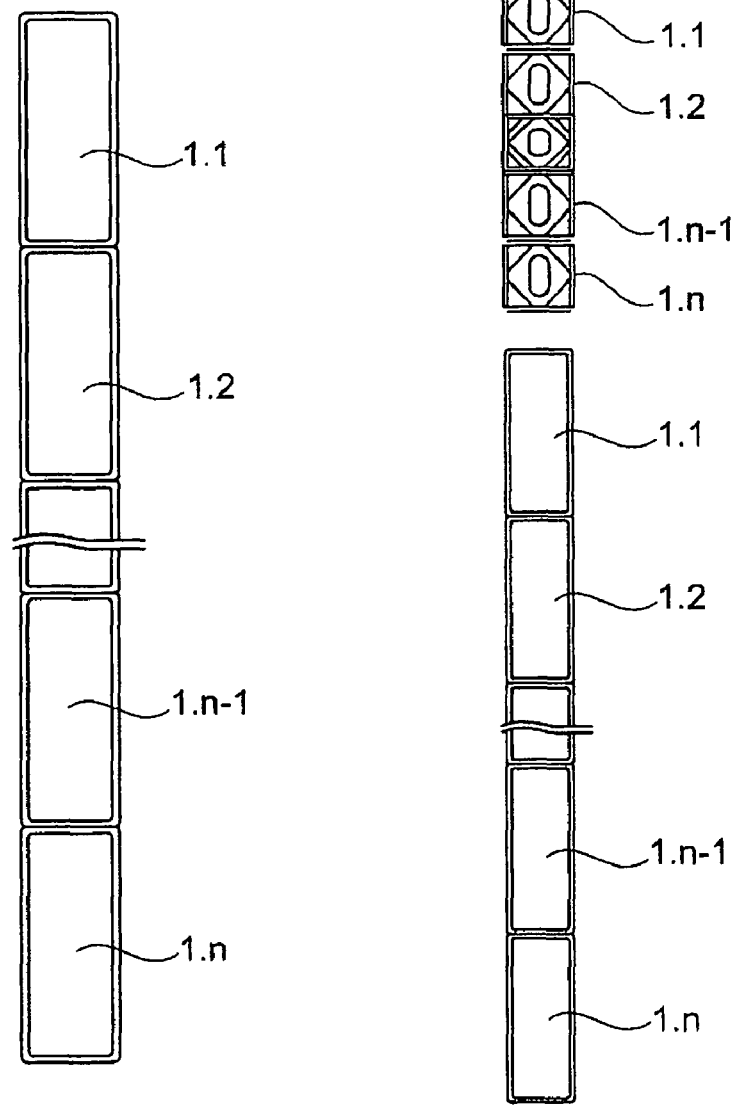
Figure 8C:
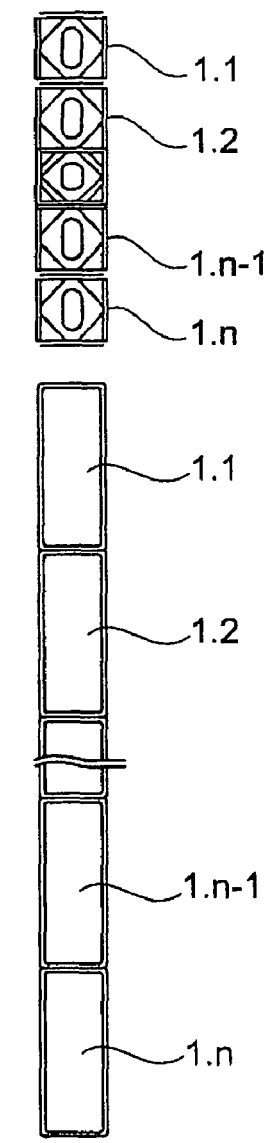
Figure 9A:
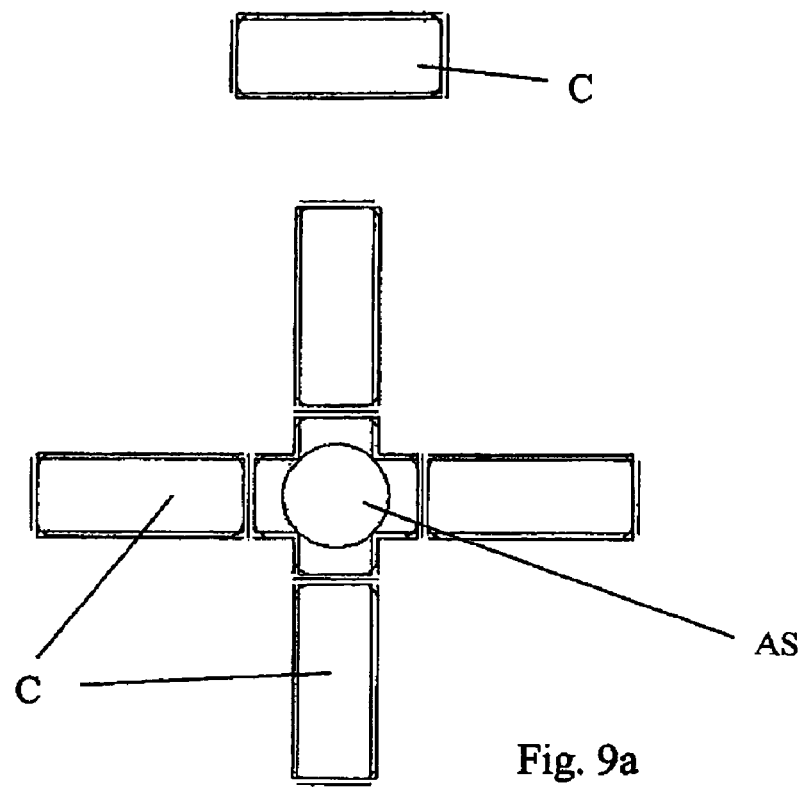
Figure 9B:
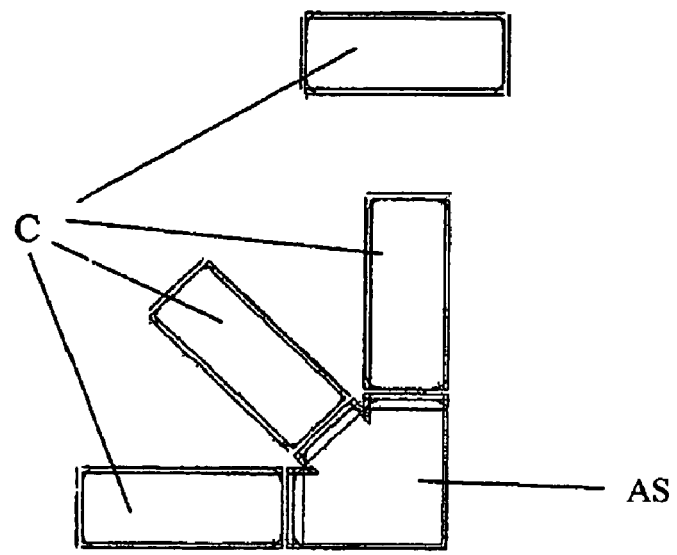
Figure 9C:
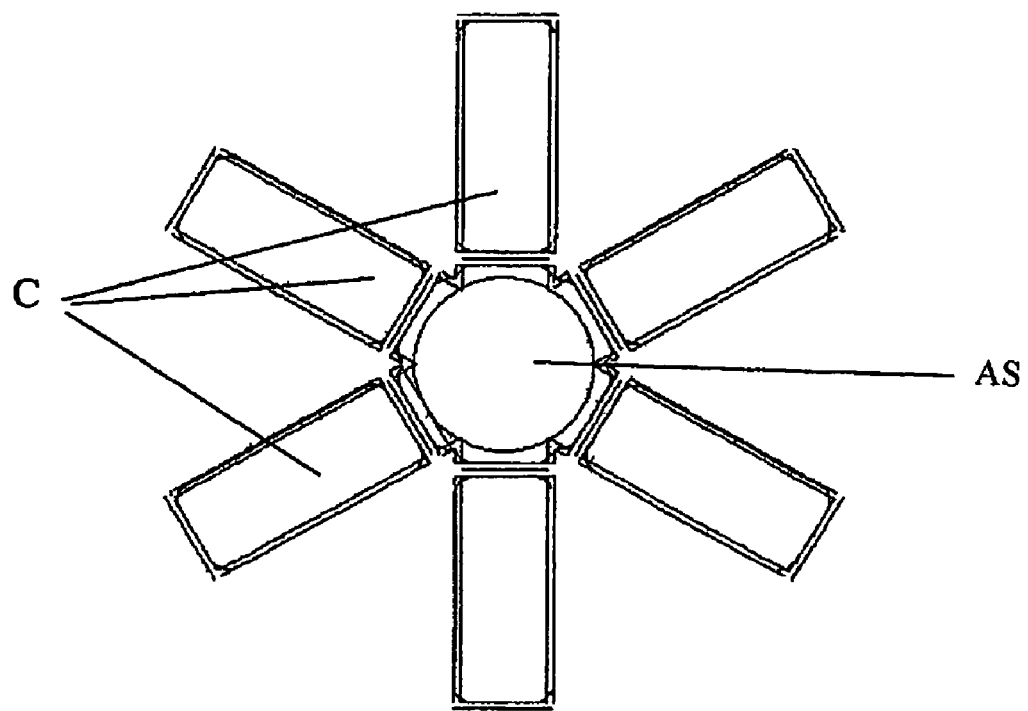
Figure 9D:
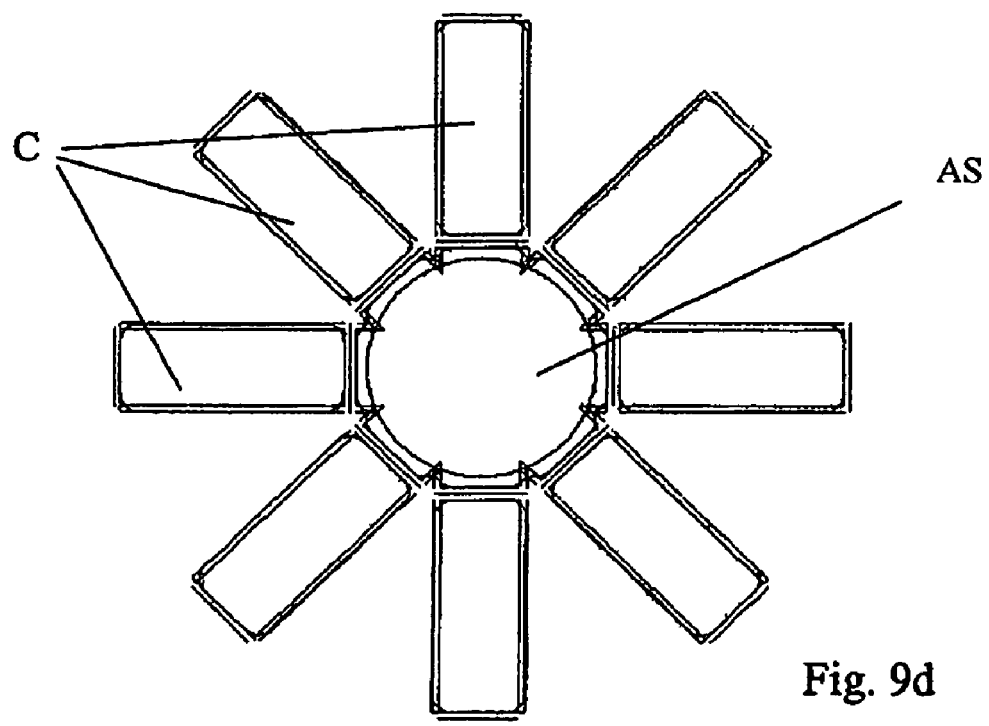

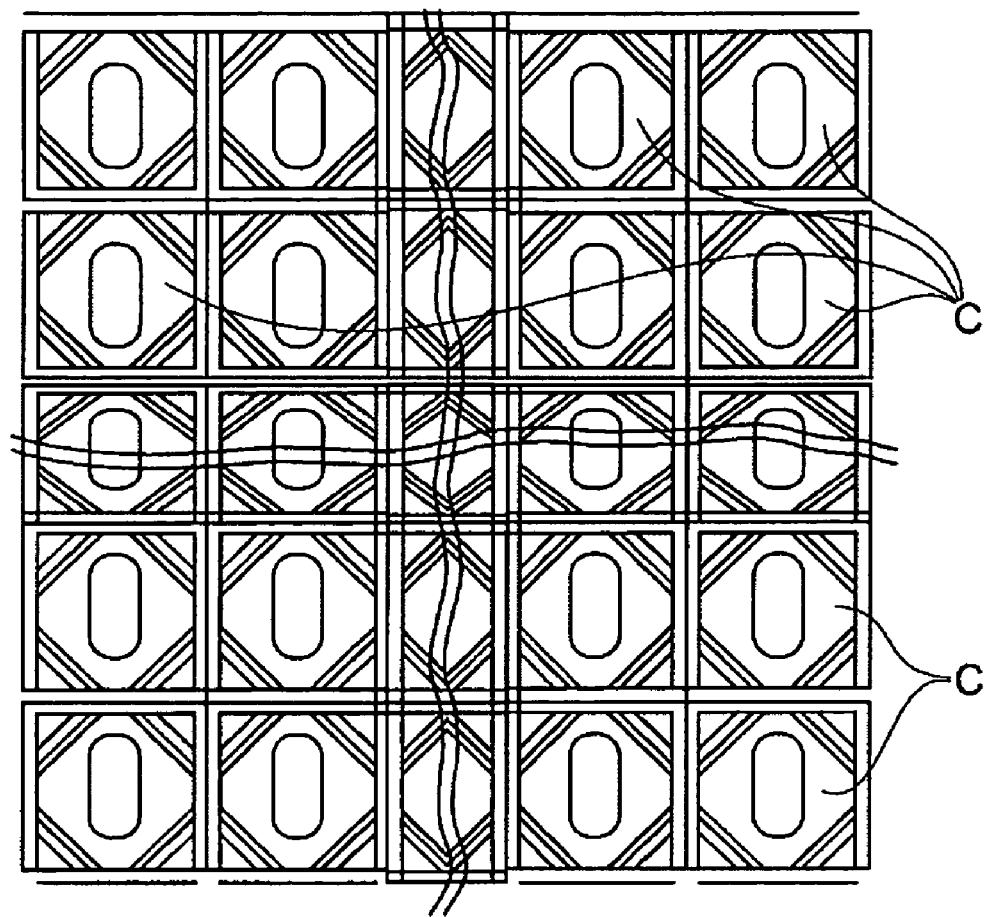
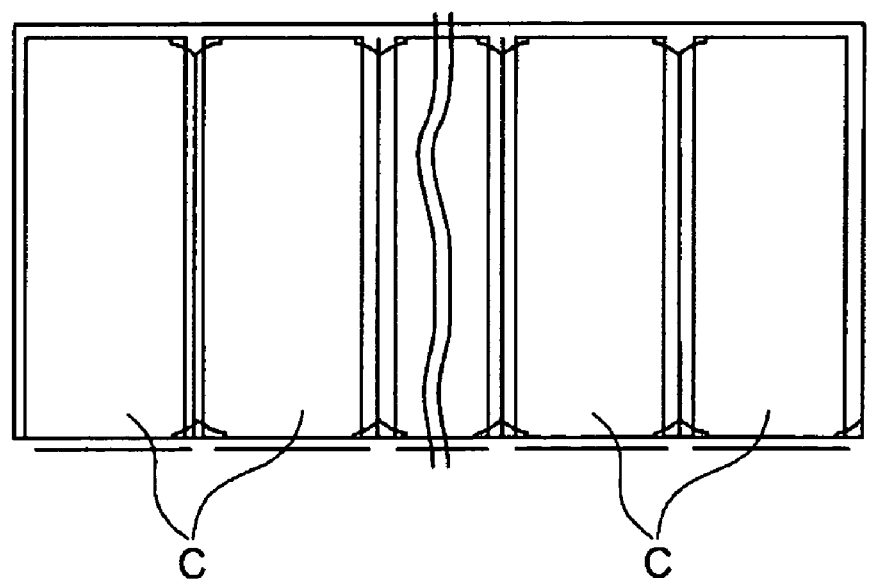
Fig. 8d

MODULAR SHELTER SYSTEM, PARTICULARLY FOR TRANSPORT OF PERSONS AND/OR OBJECTS

CROSS REFERENCE TO RELATED APPLICATIONS

Applicants claim priority under 35 U.S.C. §119 of German Application No. 203 15 057.0 filed Sep. 26, 2003. Applicants also claim priorty under 35 U.S.C. §365 of PCT/DE2004/002134 filed Sep. 24, 2004. The international application under PCT article 21(2) was not published in English.

The invention relates to a modular shelter system, particularly for transport of persons and/or objects, according to the preamble of the first claim.

According to DE 197 54 708 A1, a military vehicle for passenger transport is known, having a crew room disposed in the rear part of the vehicle. The shape of the crew container is configured to be essentially rectangular in cross-section, along the longitudinal direction of the vehicle, and to widen in linear manner, at first, in cross-section, transverse to the longitudinal direction of the vehicle, and then to narrow downward. The seats located in the crew container can be pivoted from an entering position to a transport position, and are mounted on consoles that are attached to the floor of the vehicle. As is evident from FIGS. 4 and 7, the vehicle floor also forms the standing surface for the persons located in it. The decisive disadvantage of this solution consists in the fact that in the case of a detonation from the floor region of the vehicle the persons located in it are at great risk due to the floor that arches into the crew room.

A mobile container having a work room and a machine room is known from DE 100 35 563 C2. In this connection, the container is configured in block shape, causing the same problem to occur as with the previously mentioned solution. No explanations were given with regard to the configuration of the housing to provide security against outside threats. However, it is evident from the drawings that obviously, no particular measures were provided in this regard.

A special housing construction for armored vehicles is described in DE 36 35 741 C1, whereby a plurality of non-metallic armor plates made of fiber-reinforced plastic is attached to a support frame by means of clamp strips. In this way, housings having a cubic or block-shaped structure, in any case always having flat side elements, ceiling and floor elements, are produced, according to FIG. 1. Also, a housing for ballistic protection is presented in EP 0631 659 B1. In this connection, attachment of the plates on profile rails takes place by way of wedges. Here again, only housings having flat side elements can be produced. These aforementioned embodiments are unsuitable for many cases of use.

It is the task of the invention to develop a modular shelter system, particularly for transport of persons and objects, which guarantees reliable protection against external military or terrorist attacks, and also against various types of mines, and which can be easily adapted to and combined for different purposes of use.

This task is accomplished with the characterizing features of the first claim; advantageous embodiments are evident from the dependent claims.

The modular shelter system particularly serves for transport of persons and/or objects, and has at least one container-like/capsule-like housing, and one accommodation system for the persons and/or objects disposed within the latter, whereby according to the invention, the accommodation system is mounted, in the direction towards the floor of the housing, so that it is uncoupled, and/or the container has a shape that guarantees the deflection of blast waves. This is guaranteed in that a space/interstice is present between the accommodation system and the floor of the housing, in which a fixed and/or shock-resistant and/or energy-resistant and/or projectile-resistant structure or structures is/are disposed.

For this purpose, the structure has a reinforcement structure in the form of a floor support in the form of a frame structure and/or energy-absorbing and/or shock-absorbing, i.e. projectile-resistant elements. The reinforcement structure is preferably produced on the basis of aluminum, magnesium, steel, fiber laminate structures, or combinations thereof, in a homogeneous or perforated embodiment; the energy-absorbing and/or shock-absorbing elements preferably consist of fiber laminate materials, elastomers, foams, honeycomb structures, renewable raw materials (e.g. wood, cork, etc.) or combinations thereof.

The placement of the reinforcement structures takes place in the direction towards the housing, and the placement of the energy-absorbing and/or projectile-resistant elements takes place in the direction towards the interior of the housing, or vice versa. Also, reinforcement structures and energy-absorbing and/or shock-absorbing elements can alternate.

The accommodation system is determined, in its position, by means of an attachment system, which engages on the housing above the space/interstice between accommodation system and the floor. The accommodation system has a base element/a base plate, and one or more seats on the latter, as needed.

Each seat is connected with the housing by way of the attachment system.

The attachment system is formed by means of one or more first attachment elements/struts articulated on in the upper or lateral region of the housing, which have a connection with the seats.

Alternatively, it is possible to form the attachment system by means of one or more second attachment elements/struts articulated on in the upper or lateral region of the housing, which have a connection with the base element/the base plate.

The attachment system can be configured to be elastic and shock-absorbing in one or more degrees of freedom. In addition, the seats can be accommodated on the attachment system in resilient manner.

The base element/the base plate can rest on the structures directly or by way of an intermediate layer. Alternatively, mounting of the base plate can also take place by way of the attachment elements.

In general, the base element/the base plate should not rest directly against the housing.

It is advantageous if shock-absorbing and energy-absorbing seats are used, whereby two seats rest against one another with their backrest regions, in each instance, and can have seating surfaces that face away from one another.

Preferably, the first attachment elements are attached to the backrests and to the region of the container that lies above them.

The seating surfaces are disposed at seat height above the base element/the base plate.

The container-shaped housings can additionally be equipped with viewing means (direct or indirect, e.g. windows, telescopes, angled mirrors, electronic viewing means), equipment for self-defense (fogging means, projectile systems, weapons station—which can be operated under protection—, shooting areas), air conditioning system, emergency power supply, ABC protection system, fire protection system, etc.

To guarantee variable equipment, the seats and/or the attachment system can easily be removed. The container-shaped housings can therefore easily be refitted, e.g. as a transport container for persons, a radio communications container, a medical station, a power generation container, a container for treating drinking water, a command post set-up, a materiel or ammunition transport container, a living, sleeping, or sanitary facilities container.

Each housing has a door/a door system or a passage opening on at least one side, whereby the door/the door system is blast-resistant and/or has a redundant emergency exit function.

Preferably, at least one door/one door system or passage opening is disposed on one or both end sides/pole sides of each housing. The housing has a circular, oval, or hexagonal cross-section in the vertical section and in a section that runs at a right angle to its longitudinal axis, or a combination of contours having spherically curved regions and planar regions, and consists of fiber laminate material, metallic material, concrete, or combinations thereof. Furthermore, honeycomb structures, foams, or renewable raw materials (e.g. wood, cork, etc.) can be integrated into the housing.

Fiber laminate materials on the basis of glass, aramide, carbon, polyester, polyethylene, polypropylene materials, or hybrids or combinations thereof, using thermoplastic or duroplastic binders, can be used, whose fiber structure can be built up as a 2D or 3D woven fabric, laid scrim, knitted fabric, or warp-knitted fabric.

The following materials or combinations thereof can be used, for example, as metallic structures of the container wall:
- steels, e.g. high-strength steels, fine-grain steels, austenitic nitrogen steels, manganese steels, manganese hard steels, armor steel;
- aluminum, ballistic aluminum, aluminum alloys;
- titanium and titanium alloys.

Furthermore, energy-absorbing laminate structures in the form of honeycomb structures, Nomex honeycombs, foams, and renewable raw materials, as well as combinations thereof, can be integrated into the structure of the container wall.

The use of concrete, preferably ballistic concrete, high-strength steel-reinforced concrete, or light concrete is also possible for the container.

For protection against outside threats, armoring can be provided directly or at a distance on the/in the wall of the container, which armoring sits directly on a base structure or is spaced apart from the latter by a gap. It is possible to configure the wall of the container as such a base structure. The armoring can also be combined with a liner (shrapnel-suppressing film) that lies behind it. Preferably, the armoring is disposed in the direction towards the outside of the container. It consists, for example, of ceramic or a ceramic laminate structure, metallic materials, or fiber laminate materials, or corresponding combinations, and can be configured as passive or reactive armoring. The use of active modular shelter systems is also possible.

Preferably, in this connection, a container shape having a circular cross-section is used, since greater resistance to blast stress can be expected from this shape, since the blast waves are deflected by this container shape. In comparison with containers having a rectangular cross-section, the weight and the attack surface can be reduced by approximately 20% by means of the cylindrical concept according to the invention. In this connection, the main energy absorption from blasts, projectiles, and mines preferably takes place by way of modules that can be added on the outside/can be interchanged, if necessary. This offers great flexibility in a tactical respect, since the module shelter concept can be adapted to the tactical deployment situations, in each instance. The basic shelter structure then merely serves to absorb the "residual energy."

The housing can be produced on the basis of a cast or welded container, a container produced using winding technology, or a blow-molded container.

In this connection, the containers can be provided with additional metallic and/or non-metallic layers on their outside and/or inside, and form the base structure for attachment of the armoring.

In total, the housing can have a multi-layer structure consisting of a combination of armoring, structures that absorb hard shock stresses, and structures that absorb energy. It therefore offers protection against all different threats and military as well as terrorist attacks, starting with small-caliber ammunition all the way to tank defense weapons and missiles having hollow charge heads, including, among other things, shrapnel from mortar and artillery grenades.

In total, direct protection starting with 14.5 mm hard-core projectiles and higher, reliable mine protection against blast projectiles, and excellent defense against terrorist charges, in which large amounts of explosive and shrapnel are used from the side, in most instances, is guaranteed with this new type of shelter concept.

Particularly by means of the uncoupling of the accommodation system in the direction towards the floor of the housing, by means of a space/interstice between the accommodation system and the floor of the housing, in which a fixed and/or shock-absorbing and/or energy-absorbing and/or impact-absorbing structure or structures is/are disposed, an excellent modular shelter system to protect against mines (e.g. blast mines with and without shrapnel effect, projectile-forming mines for tank defense, blast charges with a terrorist background, such as car bombs or suitcase bombs with or without shrapnel effect) is created. The detonation effect, which mainly impacts the lower region of the container, is taken up and absorbed by the structures, so that the persons and/or objects located on the accommodation system are not endangered. Furthermore, part of the shock waves is deflected, particularly by means of a housing wall having a spherically curved contour.

It is furthermore possible to provide the container with radar shielding and infrared shielding, as well as with electromagnetic shielding.

The container is either part of a vehicle or can be accommodated by a vehicle. For this purpose, a support frame or a frame structure having transport accommodations can be attached to the outside of the housing, which permits its direct accommodation on a vehicle or a conventional container or container transport vehicle.

Within the framework of the modular shelter system, it is possible to couple several container-shaped housings directly with one another or to couple them with one another by way of adapter elements. In this connection, each adapter system preferably has three or four docking positions, which can be opened or closed towards the adjacent housing. In this way, it is possible to combine containers having different equipment and functions variably with one another, in terms of equipment and number, to form a complex shelter system.

Using the invention, a new type of modular shelter system is created, which guarantees the safety of the persons and objects contained in it to the highest degree, in the case of military or terrorist outside attacks, and can be adapted to the most varied purposes of use, because of its refittability and the variable structure.

Figure 1:
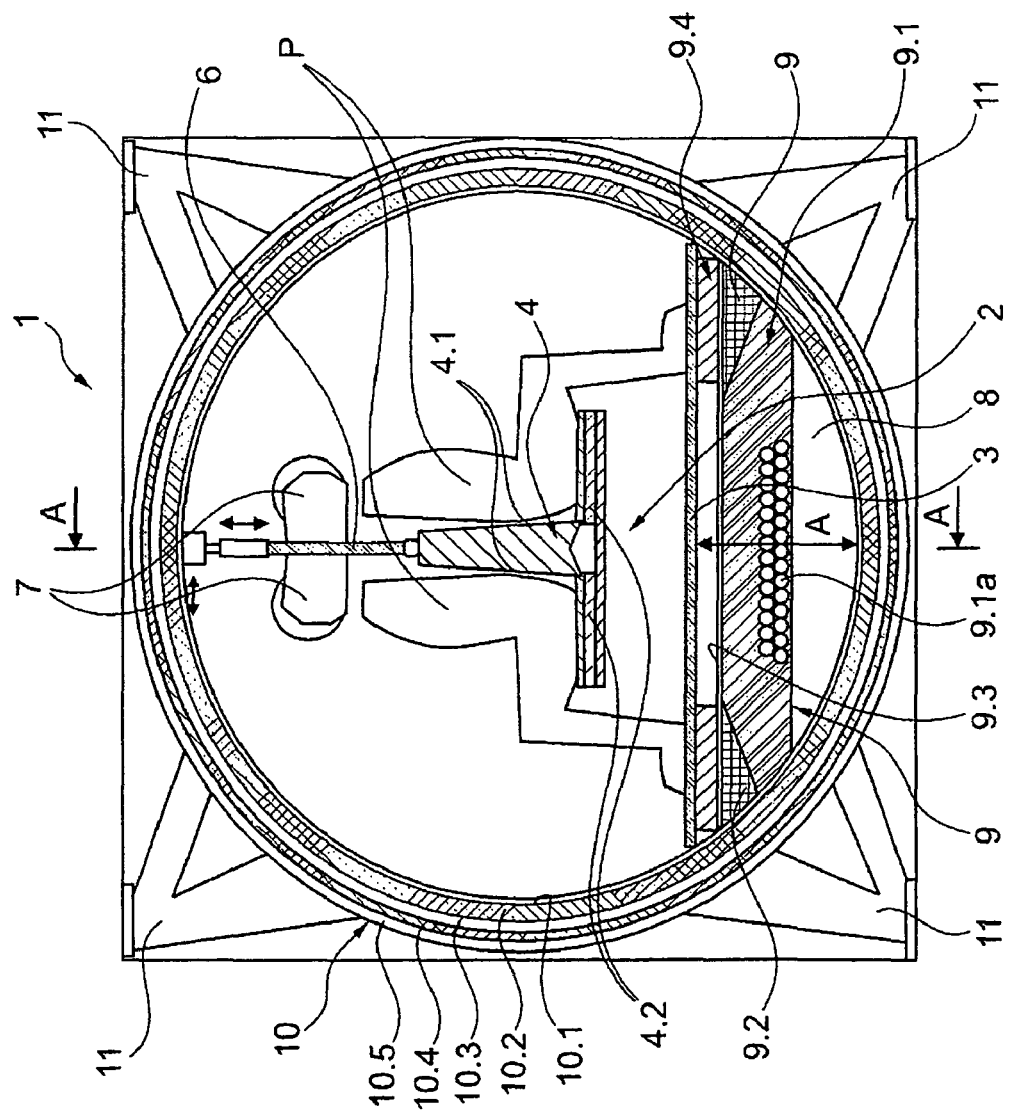
Figure 2:
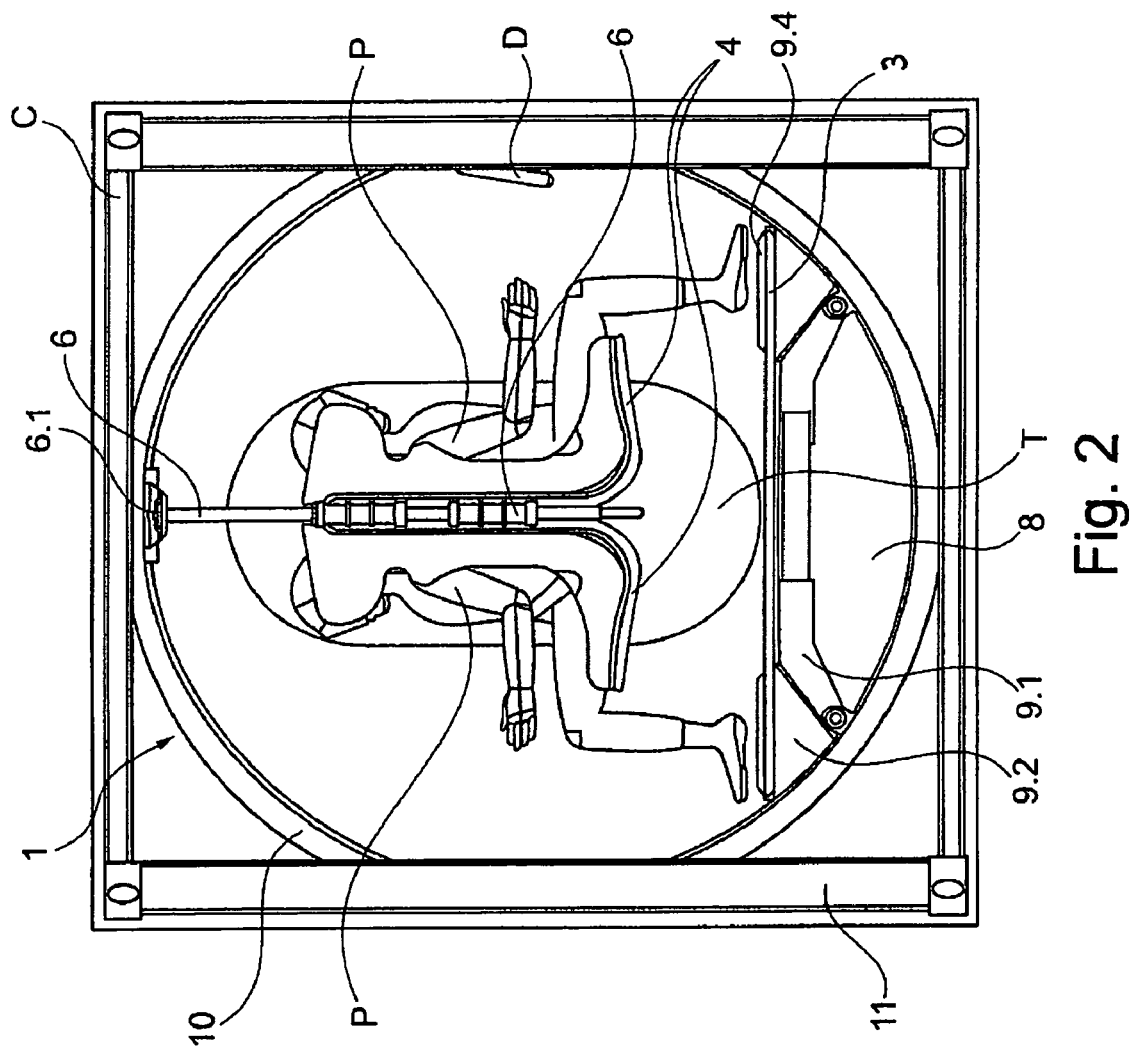
Figure 3:
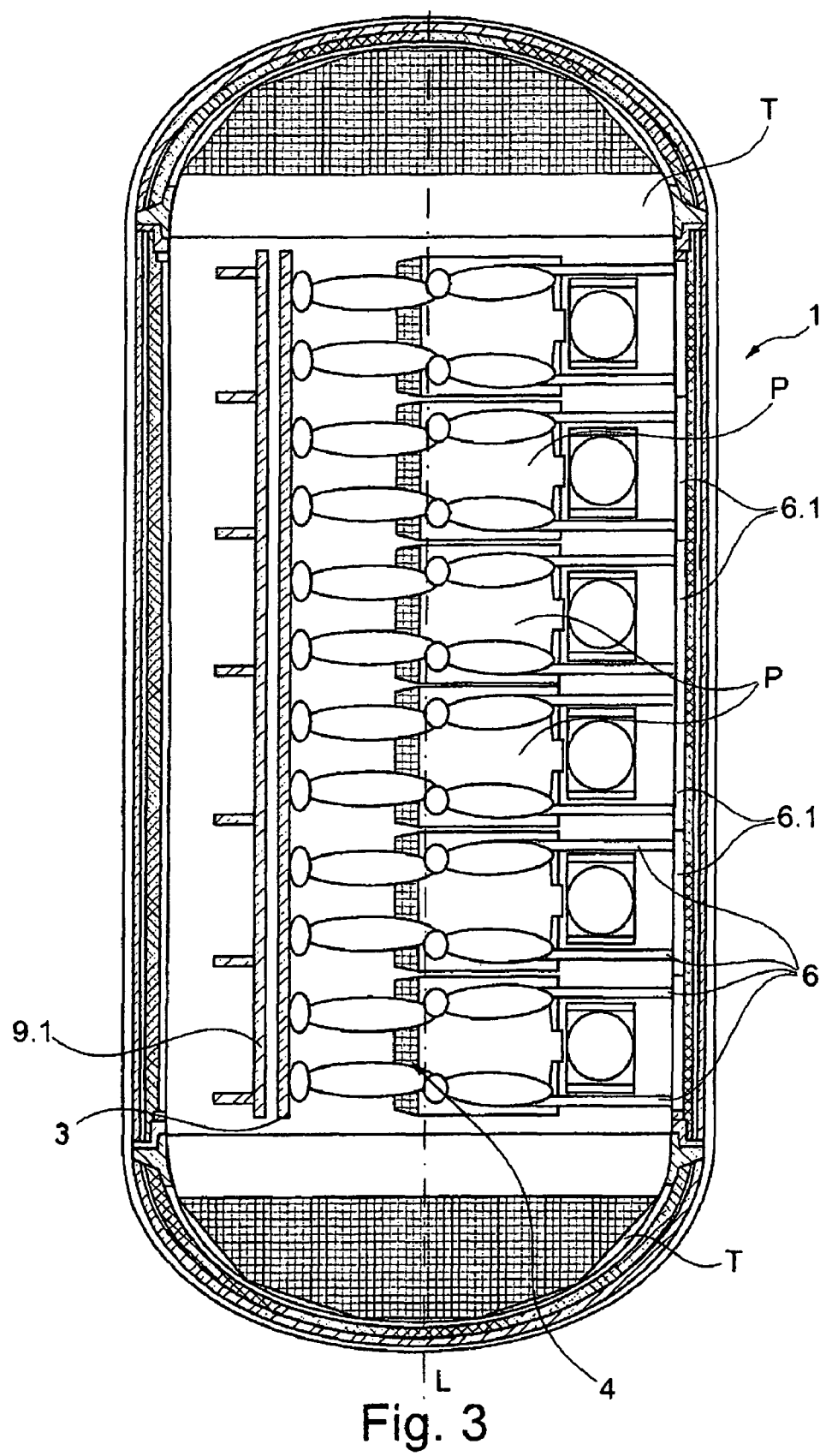
Figure 4:
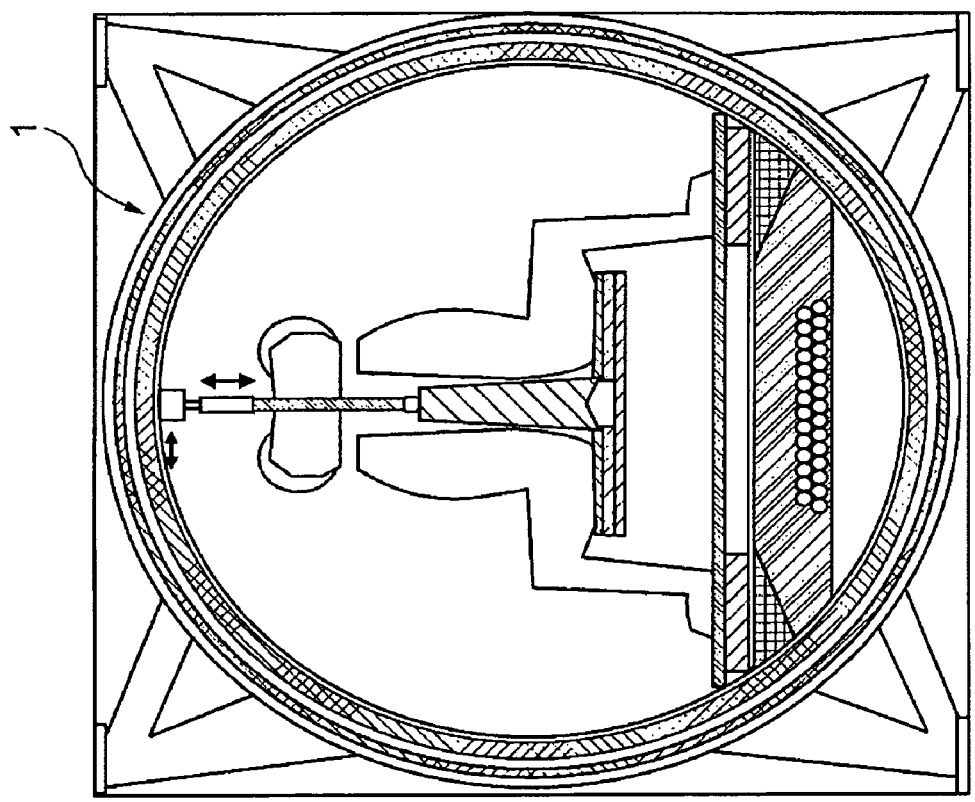
Figure 5:
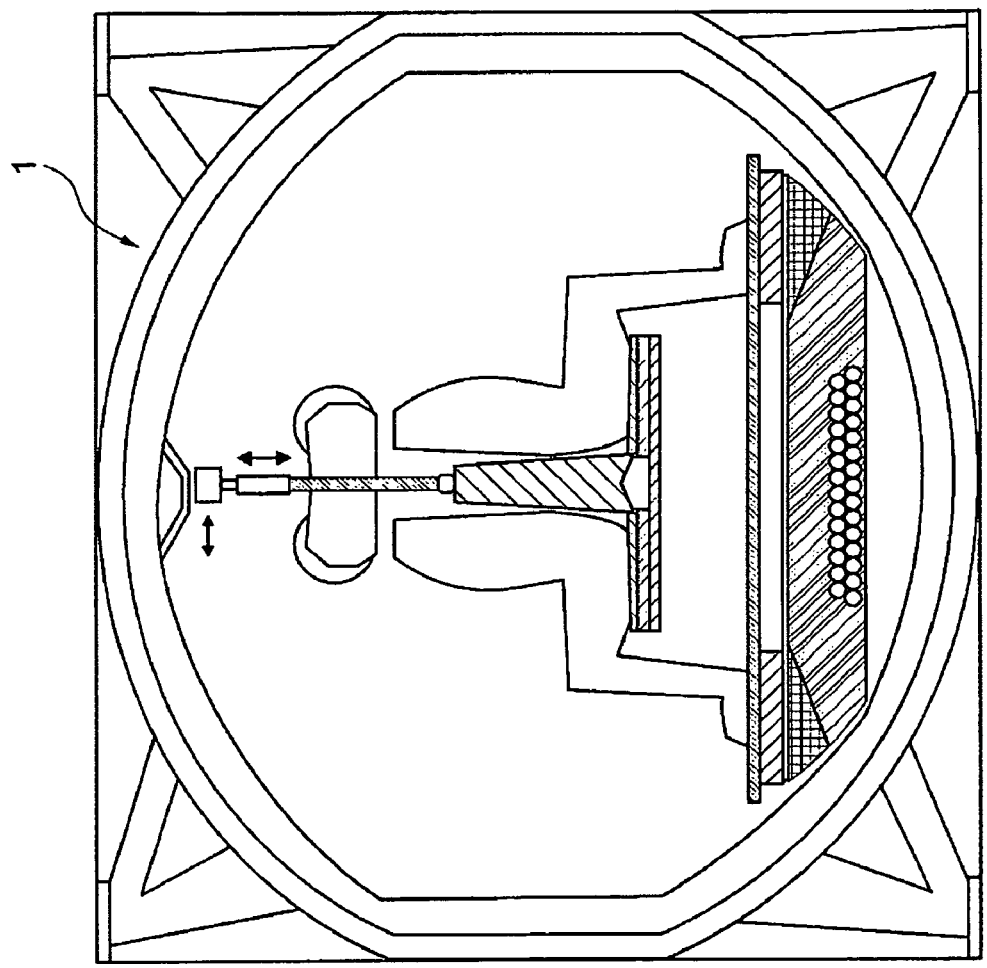
Figure 6:
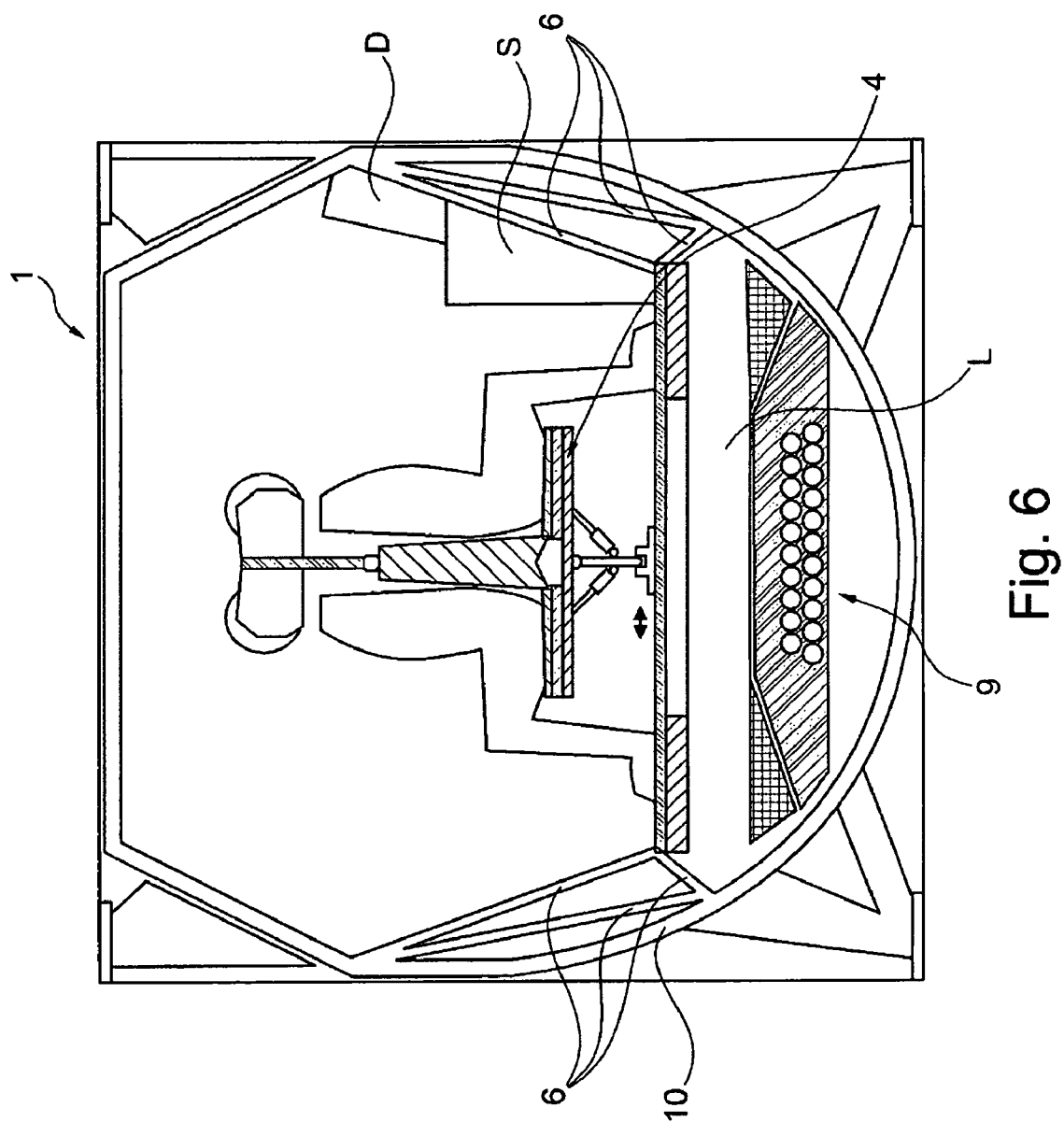
Figure 7:
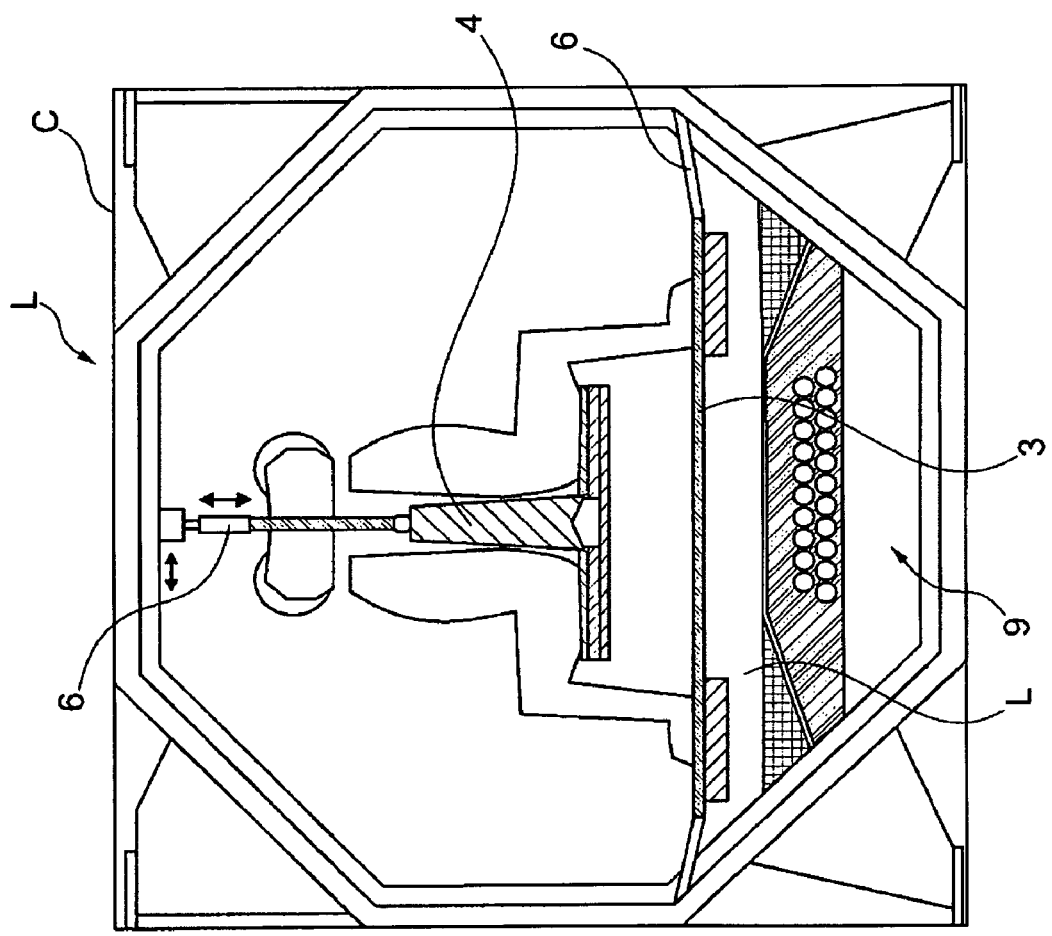

The invention will be explained in greater detail in the following, using exemplary embodiments and related drawings. These show:

FIGS. 1 and 2: container having a circular cross-section,

FIG. 3: longitudinal section according to FIG. 1 through the container,

FIG. 4: container having an elliptical cross-section,

FIG. 5: container having a spherically curved surface towards the bottom and the top, and flattened longitudinal sides, FIG. 6: container having a spherically curved surface, in cross-section, towards the bottom, and a trapezoid-shaped contour that narrows towards the top, FIG. 7: container having a hexagonal cross-section, FIG. 8a to 8d: combination possibilities of several containers, FIG. 9a to 9d: combination of several containers, using an adapter system.

According to FIG. 1, the container 1 has a circular cross-section. The accommodation system 2 consists of a base plate 3 on which seats 4 are attached. Two seats 4, in each instance, border on one another with their backrest regions 4.1, and have seating surfaces 4.2 that face away from one another. The backrests 4.1 are attached to regions of the housing 1 that lie above them, by way of attachment elements/struts 6. A head protector 7 is provided on the struts 6. The seating surfaces 4.2 are located at seat height above the base plate 3. Persons P are accommodated by the seats 4, and the base plate 3 serves them as a stepping surface and support for their feet. In the direction towards the top of the container 1, sufficient head clearance is provided.

Under the base plate 3, in the compartment 8 formed by the space A from the underside of the housing 1, a structure 9 is present that makes it possible to absorb the deformation that forms in the case of a detonation underneath the container. This can additionally be achieved, to a high degree, by means of fixed and/or energy-absorbing and/or shock-absorbing structure 9. In this way, the persons P are protected in their accommodation position.

Here, the structure 9 consists of a floor support 9.1 made of aluminum (alternatively, magnesium and/or fiber laminate structures) having a weight-saving perforation 9.1a, which beam rests on the inside of the container 1 and narrows in cross-section towards the top. The region that is formed on both sides for narrowing is filled with hard foam 9.2. The hard foam 9.2 and the floor support 9.1 are covered by a plate 9.3 (alternatively by a film). A metallic honeycomb structure 9.4 is disposed above the plate 9.3 (alternatively, a foam structure can also be used). Instead of this structure design, other variants in terms of sequence and material selection are also possible, but they will not be described in detail here. According to this embodiment, the base plate 3 sits directly on the structure 9.

The structure of the housing wall 10 of the container is the following, from the inside to the outside:
  sound-proofing covering 10.1,
  first layer of fiberglass-reinforced plastic 10.2, wound,
  honeycomb structure 10.3 (metallic or non-metallic or foam structure),
  second layer of fiberglass-reinforced plastic 10.4,
  protection against projectiles, mines, and blast charges 10.5.

On the outside diameter of the container 1, a support frame or a frame structure 11 having transport accommodations for accommodation in a standard container C, shown with broken lines, is provided. The modular shelter system according to FIG. 2 has an almost identical structure. Here, however, the floor support 9 is not configured to be perforated, and the honeycomb structure 9.4 sits above the base plate 3. Furthermore, a door or door opening T is indicated at the back/front of the container 1. It is furthermore shown schematically that displays D can be disposed in the interior of the container 1. Aside from corresponding display elements, the containers 1 can, of course, be equipped with the most varied equipment.

The attachment elements 6 for the seats 4 can be attached to the housing 1 by means of an adapter system 6.1, and therefore are easily interchangeable.

The cross-section A-A along the longitudinal axis L of the housing 1 (without the frame structure 11 having transport accommodations, and container) according to FIG. 1 is shown in FIG. 3. Several seats 4 (in this case six, in pairs, in rows behind one another) are disposed in the longitudinal direction of the container 1. The seats 4 are attached to the adapter system 6.1 by way of the struts 6. On both end sides of the housing 1, there are doors T, which possess a shape that is domed convex to the outside, and have a layer structure that corresponds to that of the housing 1. In this connection, the doors T are configured to be removable. The rib-like configuration of the floor support 9.1 can be seen in this representation. The other components of the structure (hard foam 9.2, plate 9.3, aluminum honeycomb structure 9.4) are also not shown, to make the illustration clearer.

Extremely reliable protection against various threats is secured, particularly by means of a surface that is curved in convex shape on all sides, since the deflection of blast waves is guaranteed, independent of the direction from which the projectiles or detonations impact.

A container 1 having an identical structure and the same equipment as in FIGS. 1 and 2, but having an oval cross-section, is shown in FIG. 4, and a container 1 having a surface that is spherically curved towards the bottom and top, and flattened sides, is shown in FIG. 5.

A container 1 having a surface that is spherically curved downwards, in cross-section, and a trapezoid-shaped contour that narrows towards the top, is shown in FIG. 6. Here, the base plate 3 is at a distance from the structure 9 by an air gap L, and by means of attachment elements 6 that are configured in strut-like manner, in the lateral region of the housing 1. The attachment of the seat 4 on its backrest 1.1 at the top of the housing 1 can therefore be eliminated. Between the two attachment elements 6, 6 and the housing wall 10, energy-absorbing material (not shown) is provided. Also, display D and cabinet and/or counter elements S can be provided in the container 1.

A container 1 having a hexagonal cross-section is shown in FIG. 7. Here again, the base plate 3 is at a distance from the structure 9 by an air gap L. The position fixation of the base plate 3 and the seats 4 takes place by way of attachment means 6 disposed on the seat backrests 4.1 and on the base plate 3, which means are connected with the housing 1, in each instance.

This "suspended" mounting of the accommodation system according to FIGS. 6 and 7 offers additional security.

The combination of several containers is shown in FIG. 8a to 8d. Several systems 1.1, 1.2, 1.n, etc., can be stacked next to and/or on top of one another in containers C, and can be accessed relative to one another by way of the door openings.

Furthermore, using an adapter system AS according to FIG. 9a to 9d, a modular structure and the combination of containers/housings 1.1, 1.2, 1.n, etc., to form an excellent, complex shelter system, can be created.

The invention claimed is:

1. Modular shelter system, particularly for transport of persons and/or objects, comprising:
  a container;
  a capsule-shaped housing disposed within said container, said housing being produced at least partially by means of winding technology, said housing having a shape, at least on an underside of said housing, which guarantees a deflection of blast waves, a support frame attached to an outside of said housing for accommodating said housing within said container; and an accommodation system disposed within said housing, said accommodation system being mounted so that said accommodation system is uncoupled from a floor of said housing extending parallel to a ground surface, wherein said accommodation system comprises a base element and one or more seats disposed above said base element;

wherein a space/interstice is present between the base element formed as a base plate of the accommodation system that is uncoupled from the floor of the housing, and a floor of the container;

wherein fixed and/or shock-resistant and/or energy-resistant and/or impact-resistant structures are disposed in the space/interstice;

wherein the base element does not rest against the housing; and wherein the structures further include a reinforcement structure in the form of floor support or in the form of a frame structure.

2. Modular shelter system according to claim 1, wherein the housing has a circular, oval, or hexagonal cross-section in the vertical section and in a section that runs at a right angle to its longitudinal axis, or a combination of contours having spherically curved regions and planar regions.

3. Modular shelter system according to claim 1, wherein the housing comprises a door having a redundant emergency exit function.

4. Modular shelter system according to claim 1, wherein the housing comprises fiber laminate material, concrete, or combinations thereof.

5. Modular shelter system according to claim 1, wherein honeycomb structures, foams, or renewable raw materials are integrated into the housing.

6. Modular shelter system according to claim 1, wherein the container is part of a vehicle or can be accommodated by a vehicle.

7. Modular shelter system according to claim 6, wherein the housing and the accommodation system are placed on a vehicle.

8. Modular shelter system according to claim 1, wherein the reinforcement structure is produced on the basis of aluminum, magnesium, steel, fiber laminate structures, or combinations thereof, in a homogeneous or perforated embodiment.

9. Modular shelter system according to claim 1, wherein the accommodation system above the structures is determined, in its position, via attachment system, which engages on the housing above the space/interstice between accommodation system and the floor.

10. Modular shelter system according to claim 9, wherein each seat of the accommodation system is connected with the base element and has a connection to the housing, by way of the attachment system.

11. Modular shelter system according to claim 9, wherein the attachment system is formed by means of one or more first attachment elements/struts articulated on in the upper or lateral region of the housing, which have a connection with the seats.

12. Modular shelter system according to claim 9, wherein the attachment system is formed by means of one or more second attachment elements/struts articulated on in the upper or lateral region of the housing, which have a connection with the base element.

13. Modular shelter system according to claim 9, wherein the attachment system is configured to be shock-absorbing in one or more degrees of freedom.

14. Modular shelter system according to claim 9, wherein the seats are accommodated on the attachment system in shock-absorbing manner.

15. Modular shelter system according to claim 1, wherein the base element rests on the structures directly or by way of an intermediate layer.

16. Modular shelter system according to claim 8, wherein the seats are configured to be shock-absorbing and energy-absorbing.

17. Modular shelter system according to claim 8, wherein two seats rest against one another with their backrest regions, in each instance, and have seating surfaces that face away from one another.

18. Modular shelter system according to claim 1, wherein the seats and/or the attachment system can be removed/disassembled from it.

* * * * *

UNITED STATES PATENT AND TRADEMARK OFFICE
CERTIFICATE OF CORRECTION

| | | |
|---|---|---|
| PATENT NO. | : 7,856,762 B2 | |
| APPLICATION NO. | : 10/573537 | |
| DATED | : December 28, 2010 | |
| INVENTOR(S) | : Deisenroth et al. | |

It is certified that error appears in the above-identified patent and that said Letters Patent is hereby corrected as shown below:

In particular, in Column 8, line 6 (Line 3 of Claim 9), after the word "via" please insert the word: --an--.

In Column 8, line 7 (Line 4 of Claim 9) after the word "between" please insert the word: --the--.

Signed and Sealed this
Fifth Day of April, 2011

David J. Kappos
*Director of the United States Patent and Trademark Office*